United States Patent
Nieminen et al.

(10) Patent No.: US 6,401,635 B1
(45) Date of Patent: Jun. 11, 2002

(54) LIQUID CARTON WASTE MATERIAL RECYCLING PROCESS AND APPARATUS FOR RECYCLING LIQUID CARTON WASTE MATERIAL

(75) Inventors: Jorma Nieminen; Juha Palonen; Markku Itäpelto, all of Varkaus; Pekka Harkki, Helsinki; Lauri Mäkipaja, Varkaus, all of (FI)

(73) Assignee: Corenso United Oy Ltd., Lahti (FI)

(*) Notice: Subject to any disclaimer, the term of this patent is extended or adjusted under 35 U.S.C. 154(b) by 0 days.

(21) Appl. No.: 09/762,640
(22) PCT Filed: Aug. 12, 1999
(86) PCT No.: PCT/FI99/00668
§ 371 (c)(1), (2), (4) Date: Apr. 5, 2001
(87) PCT Pub. No.: WO00/09771
PCT Pub. Date: Feb. 24, 2000

(30) Foreign Application Priority Data

Aug. 12, 1998 (FI) ................................................. 981742

(51) Int. Cl.⁷ ............................. F23G 5/02; F23K 1/00
(52) U.S. Cl. ................... 110/342; 110/346; 110/218; 110/219; 110/220; 110/221; 110/233; 110/238; 110/243
(58) Field of Search ............................... 110/342, 346, 110/347, 218, 219, 220, 221, 222, 223, 232, 233, 235, 238, 243, 244, 245; 75/961; 423/148

(56) References Cited

U.S. PATENT DOCUMENTS

| | | | |
|---|---|---|---|
| 3,719,171 A | * 3/1973 | Brooks | 48/197 R |
| 3,830,636 A | * 8/1974 | Marsh | 44/1 D |
| 4,133,273 A | * 1/1979 | Glennon | 110/346 |
| 4,244,706 A | * 1/1981 | Forney et al. | 48/202 |
| 4,444,007 A | * 4/1984 | Mitchell et al. | 60/39.02 |
| 4,478,725 A | * 10/1984 | Velling et al. | 210/703 |
| 4,589,356 A | * 5/1986 | Adams et al. | 110/347 |
| 4,632,731 A | * 12/1986 | Bodle et al. | 201/4 |
| 4,793,855 A | * 12/1988 | Hauk | 75/26 |

(List continued on next page.)

FOREIGN PATENT DOCUMENTS

| | | |
|---|---|---|
| DE | 197 22 677 | 12/1998 |
| GB | 1 356 894 | 6/1974 |
| JP | 10081885 | 3/1998 |
| WO | WO 87/05052 | 8/1987 |
| WO | WO 93/23579 | 11/1993 |
| WO | WO 97/41269 | 11/1997 |
| WO | WO 99/32673 | 7/1999 |

OTHER PUBLICATIONS

Menges, "Pilotanlage zur Entwicklung einer AP–Stoffaubereitung fër Verbundpapiere mit Rückgewinning der verwertbaren Verbundstoffe im Hause PWA IP, Redenfelden", Wochenblatt für Papierfabrikation Nr 22, p. 911–914, vol. 120, 1992.

Primary Examiner—Ira S. Lazarus
Assistant Examiner—K. B. Rinehart
(74) Attorney, Agent, or Firm—Nixon & Vanderhye P.C.

(57) ABSTRACT

Process for recycling of liquid carton waste material or other similar waste material having fibrous, metal and plastics materials. The process includes introducing the waste material and a slushing liquid into a slushing apparatus and slushing of the waste material to thereby form defibrated fibrous material therein. The treated waste material is then separated into (i) a fiber suspension which includes the defibrated fibrous material, and (ii) a reject portion which includes the metal and plastics materials. The obtained fiber suspension is cleaned and the fibrous material therein is reclaimed for further use. The reject portion is introduced into a fluidized bed gasifier so as to gasify the plastics therein to produce a hydrocarbon product gas, which is thereafter separated from the metal material.

23 Claims, 1 Drawing Sheet

U.S. PATENT DOCUMENTS

| | | | |
|---|---|---|---|
| 4,898,107 A | * 2/1990 | Dickinson | 110/346 |
| 4,919,686 A | * 4/1990 | Edwards | 48/197 R |
| 4,995,324 A | * 2/1991 | Williams | 110/234 |
| 5,211,723 A | * 5/1993 | Khan | 48/197 R |
| 5,364,996 A | * 11/1994 | Castagnoli et al. | 585/241 |
| 5,445,659 A | * 8/1995 | Khan et al. | 48/197 R |
| 5,506,036 A | 4/1996 | Bergerioux | |
| 5,536,373 A | * 7/1996 | Carlson et al. | |
| 5,626,088 A | * 5/1997 | Hiiltunen et al. | 110/243 |
| 5,658,359 A | * 8/1997 | Berg et al. | 48/197 R |
| 5,667,556 A | 9/1997 | Orth et al. | |
| 5,846,378 A | * 12/1998 | Phipps | 162/29 |
| 6,055,915 A | * 5/2000 | Bickell et al. | 110/186 |
| 6,279,493 B1 | * 9/2001 | Beaumont el al. | 110/346 |
| 6,283,048 B1 | * 9/2001 | Fujinami et al. | 110/346 |

\* cited by examiner

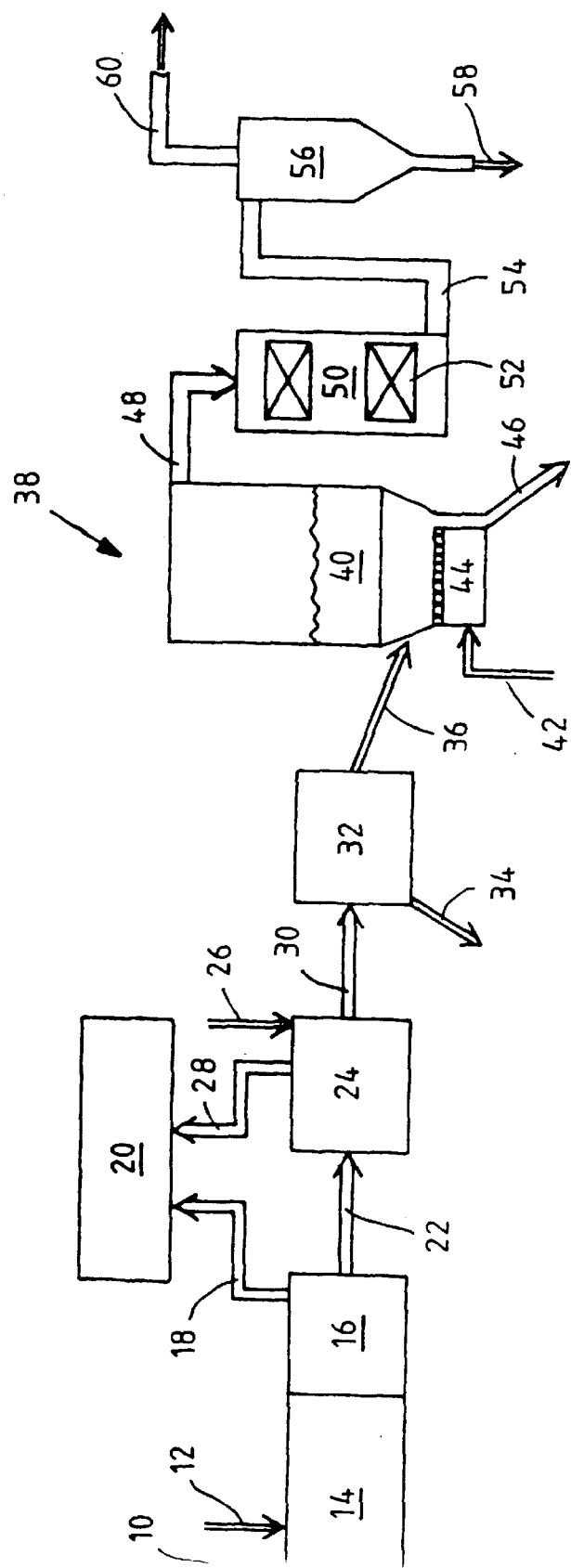

LIQUID CARTON WASTE MATERIAL RECYCLING PROCESS AND APPARATUS FOR RECYCLING LIQUID CARTON WASTE MATERIAL

The present invention relates to processes and apparatus for recycling liquid carton waste material or other similar waste material which includes fibrous material, metal and plastic material.

Liquid container board, such as milk or juice carton, is typically made of layers of fibrous material, very thin metal foils, such as Al-foil, and plastic material, the plastic material usually being polyethylene. Liquid carton waste material typically contains high quality fibers, which may be recovered and re-used in e.g. production of paper roll cores or other high quality products.

It is known that the fibrous material in container board waste material can be recovered by slushing the waste material in a pulper or other suitable slushing apparatus. In the pulper waste material and water is vigorously mixed, whereby fibrous material defibrates. Defibrated fibers and water form an aqueous suspension, which may rather easily be separated from the rest of the solid waste material, the so called reject portion, mechanically, e.g. by sedimentation, centrifugation or screening. The fiber fraction in the aqueous suspension may then be further processed, e.g. cleaned, if needed, and then utilized in any suitable board or paper manufacturing process. The reject portion has until now been disposed of as a waste material, as such, without further upgrading, or it has been combusted in order to decrease the volume of the rejected waste material before transporting it to a final depot location.

It is also known to combust liquid carton waste, as such, without first separating fibrous material therefrom, in order to recover energy therefrom as thermal energy. It has further been suggested to gasify community waste or other similar waste material for providing useful product gas, which may be used for energy generation.

Liquid carton waste material, however, contains aluminum in a form which may melt already at temperatures of about 670–700° C. Waste material, if combusted or gasified with air, should therefore be treated at temperatures well below the melting point of aluminum present therein, preferably well below 650° C., in order to avoid problems derived from molten aluminum.

Aluminum dust may be a very hazardous component in any combustion process. Aluminum if oxidized may form locally very high temperatures, temperatures above 2000° C., or even almost 3000° C. Such high local temperatures in combustors can cause severe damage to the combustor. Further aluminum in dust form is an explosive material when mixed with air. Also metallic aluminum may react with alkali hydroxide, e.g. present in fly ash, and form aluminum hydroxide and hydrogen gas. It is well known that hydrogen gas under certain conditions may easily form explosive gas mixtures. Also storage of fly ash with aluminum may cause problems as formation of hydrogen gas in the fly ash may continue for a long time in its dumping place.

Liquid carton waste material also contains a considerable amount of plastic material, which today is mostly polyethylene or other plastic material, which does not contain chlorine, and which therefore can rather easily be gasified with air. Plastic material consists of almost 100% volatiles, which is possible to totally convert to gases and vapors in the air blown gasifier at temperatures of about 550–650° C., i.e. below the melting temperature of aluminum present.

The fibrous material in liquid carton waste material, on the other hand, contains only about 75–85% volatiles. The rest of the fibrous material is fixed carbon. At temperatures between 550–650° C., i.e. below the melting point of aluminum present, only about 60–75% of the fibrous material is converted to gases and vapors.

It may be rather difficult to control the temperature of a gasifier, so that maximum conversion of fibrous material to gases and vapors is achieved, while still avoiding problems arising from molten aluminum.

Publication WO-A-97/41269 shows a process for the recovery of aluminium and energy from used packages of the "Tetrabrick" type and an oven for implementing such process. The oven showed has, however, a complicated structure with several moving elements. The control of temperature in different areas of the oven is probably rather difficult.

The present invention sets out to provide an improved process for recycling of liquid carton waste material and an improved apparatus therefore, which overcomes drawbacks discussed above.

It is also an object of the present invention to provide a process and apparatus for recycling liquid carton waste material in which the fibrous material present in the waste material, as well as, the heating value of the plastic material are both recovered in an optimum way.

It is a further object of the present invention to provide a process and apparatus for recycling liquid carton waste material in which also aluminum, or possible other metal present in the waste material, may be recovered in an optimum form.

It is a still further object of the present invention to provide a process and apparatus for recycling liquid carton waste material at a relatively low temperature, at which many problems arising from high temperatures in the gasification and gas cleaning processes can be avoided.

The present improved process and apparatus for recycling liquid carton waste material thereby are characterized by what is more closely stated in the characterizing portions of appending independent claims.

Thereby the present invention provides a process for recycling of liquid carton waste material or other similar waste material which includes fibrous material, metal and plastic material, including following steps
(a) introducing the waste material and a slushing liquid, typically water, into a pulper or other similar slushing apparatus for slushing of the waste material and defibration of the fibrous material therein,
(b) separating the waste material treated in step (a) into
   a fiber suspension including defibrated fibrous material and
   a reject portion including metal and plastic material, and
(c) cleaning the fiber suspension of step (b) and recovering the fibrous material therein for further use, in e.g. board or paper manufacturing,
(d) introducing the reject portion from step (b) into a gasifier, for gasification of plastic material therein, and
(e) separating metal, typically Al-material, from gas produced in step (d).

The reject portion may be gasified with air at a temperature below the melting temperature of the metal present in the liquid carton waste material. The gasification of a reject portion including aluminum should preferably take place at a temperature below 700° C., typically at a temperature range of about 550–650° C.

The gasification typically takes place in a bubbling fluidized bed gasifier. Metal foil flakes can very easily be discharged from the gasifier together with product gas generated therein. In a slow fluidized bed the metal foil material is treated rather gently and is not ground too much. Too fine, dust like, metal particles would be more difficult to separate from the product gas later on.

During slushing of the waste material in a pulper or other similar slushing apparatus alkali metal salts, such as Na- and K-salts, are dissolved in the slushing liquid. Alkali salts are thereby separated from the reject portion already at the slushing stage and will not reach the gasifier and cause problems therein.

Preferably a further step (f) comprising cooling of gas produced in step (d) in the gasifier is inserted between step (d) and step (e), for recovering heat energy from the product gas. Thereby also the separation of metal, typically aluminum, from the gas, after cooling, is made more easy.

In order to maximize the yield of fibers recovered from the waste material, the reject portion derived from the separator in step (b) may be washed in a separate additional washing step for further recovery of further fibers therefrom. Thus nearly all fibers may be recovered for further use as fibers, instead of being partly gasified.

The reject portion may be mechanically separated from the liquid fibrous suspension, by sedimentation, centrifugation, screening or any other suitable way known per se. The reject portion, from which fibers have been separated, may then be dewatered and introduced into a gasifier, for further processing. The reject portion is preferably dewatered to include <50% water, e.g. 10–50% water, typically about 30% water.

Often, however, an additional cleaning of the reject portion is performed, before or after the dewatering thereof. Particularly heavy solid impurities, which may be contained in any waste material introduced into a pulper, are rather easily separated mechanically, or even if desired magnetically, from the light reject portion, consisting of light plastic material and light aluminum foil material. Heavy solid impurities typically originates from iron scraps, metal straps or similar used to bind waste material into bales. The heavy solid impurities may, of course, if desired be separated already in an earlier stage, during flushing or immediately thereafter Most heavy impurities are, as discussed above, separated from the waste material before it is introduced into the gasifier. Some heavy metal material may, however, still remain in the reject portion when it is introduced into the gasifier. Such remaining heavy metal impurities will discharge from the gasifier together with bottom ash, being discharged from the bottom of gasifier. Impurities originating from heavy metal scrap or the like is too heavy to be entrained by the upward gas flow in the gasifier and is therefore not mixed into the product gas and the light metal material fraction being discharged from the top of the gasifier.

Light aluminum foil material typically having a thickness of only about 5–10 μm, will easily be entrained by the product gas and flow out with the gas from the gasifier. The light metal fraction, thus being separated from heavy metal material possibly present in waste material, is thereafter easily separated from the product gas flow in some conventional separator, known per se. A particular separator for separating light metal flakes or foil material from gas may preferably be used.

The present invention provides a recycling process in which the light metal fraction of the waste material may be separated from both fibrous material, as well as, gasified plastic material without thereby simultaneously separating and mixing into the light metal fraction other metal material or other heavy impurities possibly present in the waste material.

The present invention provides a process according to which liquid carton waste material may be recycled such that a maximum amount of fibers present in the waste material is recovered for further useful use; metal present is recovered in a very clean form, and plastic material is recovered as a clean high heat value product gas. The heat value of gas produced from polyethylene may be in a range between 7–15 MJ/m$^3$, typically 9–12 MJ/m$^3$. Conventional biomaterial only provides a heat value of about 3–6 MJ/m$^3$.

The present invention will now be described in more detail in accordance with enclosed figure showing schematically a process according to the invention.

Liquid carton, packing or packaging board, waste material 10 and water 12 is introduced into a pulper 14, in which the waste material and water are mixed while vigorously stirring or beating the waste material, to slush the material and defibrate firbrous material therein. Typically fibrous material content in liquid carton waste material amounts to about 70%. The rest 30% mainly includes metal foil material and plastic material. The waste material treated in the pulper and the aqueous fiber suspension thus formed are transferred to a separator section 16 from which the fibrous suspension 18 is discharged and transferred for further processing as a recycled fiber material in fiber treatment section 20, e.g. paper or board manufacturing. The separation in separator 16 may take place with any suitable means, preferably mechanical means such as sedimentation, centrifugation or screening.

Reject material 22 from which the fiber suspension has been separated and which now contains mainly plastic and metal material is transported to a washing section 24, in which additional water 26 is introduced into the reject material for separating additional fibers therefrom. A new fiber suspension 28 is formed and transported to the fiber treatment section 20, to be combined with the formerly separated fiber suspension. The different fiber suspension portions 18 and 28 may, of course, be transported to different end use and do not have to be combined.

Washed reject material 30, now including mainly clean plastic material and metal material, is transported from the washing section 24 to a further cleaning and dewatering section 32. In the cleaning section heavy solid material 34, such as heavy metal scrap if present, is separated from the reject material. The separation may take place with any suitable separation means, typically some mechanical means. Iron material may be separated with magnetic means. Finally the reject material is dewatered by any dewatering means, known per se, to a water content of about 10–50%. Water is discharged.

The dewatered reject material 36 is introduced into a fluidized bed gasifier 38. The fluidized bed gasifier shown in the figure is a bubbling fluidized bed gasifier, typically having a bed 40 fluidized by air having a velocity of about ½–2 m/s. A gasifier with a fast circulating fluidized bed or some other gasifier known per se may be used, if suitable.

The fluidized bed typically consists of sand having a granular size of about 500–2000 μm or of some other similar granular material. Fluidizing gas and product gas flow upward in the gasifier and out therefrom. Light metal foil material is entrained in the gas and discharged from the gasifier. Bed material, consisting of substantially more heavy material, is not entrained in the gas and therefore remains in the bed.

The bubbling fluidized bed material provides a very constant gasification temperature, e.g. a temperature of about 550–650° C. may be maintained in the gasifier 38. Air 42 is introduced as fluidizing and oxidizing gas into the furnace through a plenum 44. Solid heavy material 46, such as iron scrap, bands or other impurities, are discharged with bottom ash through the bottom of the furnace. Metal material flakes originating from the liquid carton are very light and flow out of the fluidized bed gasifier with the gases and will not stay in the bed portion in the lower part of the furnace.

In the gasifier plastic material is almost completely gasified, providing a product gas rich in rather long hydrocarbons. The gas comprises relatively small amounts of CO, $CO_2$, or $H_2$. The heat value of the gas is typically.in the range of 7–15 $MJ/m^3$, usually 9–12 $MJ/m^3$. The product gas is discharged from the gasifier through outlet 48.

The product gas from the outlet 48 of the gasifier is introduced into a gas cooler 50, in which heat is recovered with heat transfer surfaces 52. The soot content of the gas is very low. Metal flakes flowing with the gas are almost free of carbon. The cooled product gas 54 is introduced into a separator 56 in which it is easy to separate the clean metal flakes. Separated solid material almost solely consists of metal originating from the liquid carton waste material. The separator 56 shown in the figure is a cyclone separator. Other separators, such as filters, may be used. The very clean separated metal material 58 is discharged for further utilization. Clean product gas 60 is discharged for energy production or for other purpose, typically in places where combustion heat of the product gas can be used.

The present invention should not be limited to only cover the specific application described above. The present invention is, on the contrary, intended to provide a protection for the present invention as broadly as defined by the appended claims.

Thus in the specification only water has been mentioned as the liquid used for slushing fibrous material. However, any other suitable liquid material may be used. Also different additives, such as pH controlling additives, may be added to the water/liquid phase to enhance slushing and defibration.

Aluminum has been mentioned as an example of fine metal material to be recovered from the liquid carton waste material. Other board waste material may comprise other metal materials, having a rather low melting point, which metal materials could be separated in a similar manner.

Polyethylene is today the most used plastic material in liquid carton. In the future other plastic materials or mixtures of plastic materials may used. Particularly other types of cartons or container boards may include other plastic materials. The present invention should cover processes and apparatuses used to recycle waste materials including these plastic materials also.

What is claimed is:

1. Process for recycling of liquid carton waste material or other similar waste material which includes fibrous, metal and plastics materials, the process comprising the steps of:
   (a) introducing the waste material and a slushing liquid into a slushing apparatus and slushing of the waste material to thereby form defibrated fibrous material therein,
   (b) separating the waste material treated in step (a) into (i) a fiber suspension which includes the defibrated fibrous material, and (ii) a reject portion which includes the metal and plastics materials,
   (c) cleaning the fiber suspension obtained in step (b)(i) and recovering the fibrous material therein for further use,
   (d) introducing the reject portion obtained from step (b)(ii) into a fluidized bed gasifier and gasifying the plastics therein to produce a hydrocarbon product gas, and
   (e) separating metal material from the hydrocarbon product gas produced in step (d).

2. Process for recycling of waste material according to claim 1, which comprises, between step (d) and step (e), a further step (f) of cooling the hydrocarbon product gas produced in step (d) and recovering heat energy therefrom.

3. Process for recycling of waste material according to claim 2, wherein said step (e) of separating metal from hydrocarbon product gas produced in step (d) is practiced after cooling of the hydrocarbon product gas according to step (f).

4. Process for recycling of waste material according to claim 1, which further comprises recovering additional fibrous material from the reject material by washing the reject portion from step (b)(ii) before introducing the reject portion into the gasifier according to step (d).

5. Process for recycling of waste material according to claim 1, wherein before introducing the reject portion into the gasifier in step (d) there is practiced the step of cleaning the reject portion from step (b)(ii) so as to separate coarse metal material and other impurities therefrom.

6. Process for recycling of waste material according to claim 1, wherein before introducing the reject portion into the gasifier according to step (d), there is practiced the step of dewatering the reject portion.

7. Process for recycling of waste material according to claim 6, the step of dewatering the reject portion is practiced so that the reject portion is dewatered to less than 50% water content before the reject portion is introduced into the gasifier according to step (d).

8. Process for recycling of waste material according to claim 1, wherein the gasifier produces a bottom ash, and wherein step (e) includes discharging heavy impurities from the gasifier with the bottom ash.

9. Process for recycling of waste material according to claim 1, wherein step (d) is practiced so as to produce a combustible gas having a high heat value of between about 7–15 $MJ/m^3$.

10. Process for recycling of waste material according to claim 1, wherein step (d) includes gasifying the plastics material at a temperature sufficiently close to, but below, the plastics material melting temperature so as to allow for the metal material to be recovered form the hydrocarbon product gas produced in the gasifier.

11. Process for recycling of waste material according to claim 1, step (d) includes gasifying the plastics material at a temperature between 550 to 650° C.

12. Process for recycling of waste material according to claim 1, wherein step (a) includes dissolving water soluble alkali salts present in the waste material, and thereafter in step (b) separating said salts from the reject portion.

13. Process for recycling of waste material according to claim 1, wherein step (a) is practiced using water as the slushing liquid and a pulper as the slushing apparatus.

14. Process for recycling of waste material according to claim 1, wherein the metal material includes aluminum.

15. Process for recycling of waste material according to claim 7, wherein the reject portion is dewatered to between about 10–50% water content.

16. Process for recycling of waste material according to claim 7 wherein the reject portion is dewatered to less than 30% water content.

17. Process for recycling of waste material according to claim 9, wherein the combustible gas has a heat value of between 9–10 $MJ/m^3$.

18. Apparatus for recycling of liquid carton waste material or other similar waste material which includes fibrous, metal and plastics materials, the apparatus comprising:

(a) a slushing apparatus for slushing of the waste material to thereby form defibrated fibrous material therein, (b) a separator for separating a fiber suspension including defibrated fibrous material from the waste material treated in the slushing apparatus, to thereby provide a reject portion including the metal and plastics materials, (c) a gasifier for gasifying the plastics material in said reject portion to form a hydrocarbon product gas therefrom, and (d) a separator arranged downstream of the gasifier for separating metal from the hydrocarbon product gas produced in the gasifier.

19. A recycling apparatus according to claim 18, which further comprises gas cooling system for cooling the hydrocarbon product gas produced in the gasifier and for recovering heat energy therefrom.

20. A recycling apparatus according to claim 19, wherein the separator is arranged downstream of the gas cooling system.

21. A recycling apparatus according to claim 18, which further comprises a washer for washing the reject portion separated in the separator to thereby separate additional fibrous material from the reject portion.

22. A recycling apparatus according to claim 18, further comprising a cleaning system for separating coarse solid impurities from the reject portion separated in the separator.

23. A recycling apparatus according to claim 18, further comprising a dewatering system positioned so as to receive the reject portion from the separator so as to dewater the reject portion and supply a dewatered reject portion to the gasifier.

* * * * *